(12) United States Patent
Ishida et al.

(10) Patent No.: US 10,747,974 B2
(45) Date of Patent: Aug. 18, 2020

(54) ITEM HAVING BARCODE, DATA PROCESSING DEVICE, DATA PROCESSING METHOD, AND MERCHANDISE QUALITY MANAGEMENT METHOD

(71) Applicant: Hitachi, Ltd., Chiyoda-ku, Tokyo (JP)

(72) Inventors: Tomotoshi Ishida, Tokyo (JP); Yuya Tokuda, Tokyo (JP); Kohhei Aida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 159 days.

(21) Appl. No.: 15/580,509

(22) PCT Filed: Jun. 26, 2015

(86) PCT No.: PCT/JP2015/068446
§ 371 (c)(1),
(2) Date: Dec. 7, 2017

(87) PCT Pub. No.: WO2016/208051
PCT Pub. Date: Dec. 29, 2016

(65) Prior Publication Data
US 2018/0189535 A1  Jul. 5, 2018

(51) Int. Cl.
*G01K 11/12* (2006.01)
*G06K 7/14* (2006.01)
(Continued)

(52) U.S. Cl.
CPC ............ *G06K 7/1413* (2013.01); *G01K 11/12* (2013.01); *G06K 7/00* (2013.01); *G06K 7/14* (2013.01);
(Continued)

(58) Field of Classification Search
CPC .. G06F 16/9554; G01K 11/12; G01N 31/229; G06K 7/1417; G06K 19/06131; G06K 2019/06262; G06K 9/2054; G06K 9/6215
(Continued)

(56) References Cited

U.S. PATENT DOCUMENTS 6,190,610 B1   2/2001  Goldsmith et al.
6,382,125 B1   5/2002  Tamura
(Continued)

FOREIGN PATENT DOCUMENTS

CN      102375969 A       3/2012
EP        2877938 A2  *   6/2015
(Continued)

OTHER PUBLICATIONS

Extended European Search Report issued in counterpart European Application No. 15896373.6 dated Feb. 12, 2019 (seven (7) pages).
(Continued)

*Primary Examiner* — Gail Kaplan Verbitsky
(74) *Attorney, Agent, or Firm* — Crowell & Moring LLP

(57) ABSTRACT

Provided is means for obtaining required data, despite there being only one kind of reading device or one kind of reading method for a plurality of item types. The present invention comprises: means for reading a barcode and a change-in-environment part; means for extracting, from the barcode which has been read, data pertaining to the change-in-environment part; and means for recognizing change-in-environment data on the basis of the data pertaining to the change-in-environment part. Further, an item has a change-in-environment part and a barcode which contains the data relating to the change-in-environment part.

12 Claims, 5 Drawing Sheets

(51) Int. Cl.
  *G06K 7/00* (2006.01)
  *G06K 19/06* (2006.01)
  *G06K 19/08* (2006.01)
(52) U.S. Cl.
  CPC ........... *G06K 7/1417* (2013.01); *G06K 19/06* (2013.01); *G06K 19/08* (2013.01)
(58) Field of Classification Search
  USPC ........ 374/124, 161, 162, 101, 141; 235/435, 235/439, 462.01; 116/216, 200
  See application file for complete search history.

(56) References Cited

U.S. PATENT DOCUMENTS

| | | | | |
|---|---|---|---|---|
| 6,557,758 | B1* | 5/2003 | Monico | B07C 3/18 |
| | | | | 235/380 |
| 8,020,770 | B2* | 9/2011 | Kamijo | G06K 9/2054 |
| | | | | 235/454 |
| 8,313,032 | B2* | 11/2012 | Fjellstad | G06K 7/10722 |
| | | | | 235/375 |
| 8,960,534 | B2* | 2/2015 | Nemet | G06K 19/06046 |
| | | | | 235/376 |
| 9,726,783 | B2* | 8/2017 | Perrier-Cornet | B41J 2/32 |
| 10,281,367 | B1* | 5/2019 | Schindler, III | G06K 19/06037 |
| 2002/0056756 | A1* | 5/2002 | Cameron | G06K 19/06018 |
| | | | | 235/468 |
| 2004/0140931 | A1* | 7/2004 | Vesuna | G01S 5/0252 |
| | | | | 342/451 |
| 2007/0152065 | A1* | 7/2007 | Gong | G06K 7/10702 |
| | | | | 235/462.45 |
| 2008/0043804 | A1* | 2/2008 | Goldsmith | G01K 3/04 |
| | | | | 374/106 |
| 2009/0212113 | A1* | 8/2009 | Chiu | G06K 7/14 |
| | | | | 235/462.41 |
| 2009/0223432 | A1 | 9/2009 | Kodama et al. | |
| 2010/0264640 | A1* | 10/2010 | Lane | B41M 3/142 |
| | | | | 283/67 |
| 2012/0031962 | A1 | 2/2012 | Li et al. | |
| 2013/0152848 | A1* | 6/2013 | Lucht | B41M 5/284 |
| | | | | 116/201 |
| 2014/0027503 | A1* | 1/2014 | Kennedy | G06F 16/58 |
| | | | | 235/375 |
| 2015/0034719 | A1* | 2/2015 | Wei | G06F 3/14 |
| | | | | 235/383 |
| 2015/0186765 | A1* | 7/2015 | Osborne | G06K 19/06112 |
| | | | | 235/375 |
| 2015/0332135 | A1* | 11/2015 | Dixit | G06F 21/36 |
| | | | | 235/469 |
| 2016/0011270 | A1* | 1/2016 | Poirier | G01K 11/12 |
| | | | | 324/426 |
| 2016/0019439 | A1* | 1/2016 | Wang | G06K 9/2054 |
| | | | | 382/183 |
| 2017/0083857 | A1* | 3/2017 | Barton | G06Q 10/0833 |
| 2017/0232773 | A1* | 8/2017 | Kamijo | G06K 7/1417 |
| | | | | 235/462.01 |
| 2018/0189621 | A1* | 7/2018 | Tokuda | G06Q 10/087 |
| 2018/0197053 | A1* | 7/2018 | Picard | G06K 7/1417 |
| 2019/0120728 | A1* | 4/2019 | Schindler, III | G06K 19/06037 |
| 2019/0197377 | A1* | 6/2019 | Studnicka | G06K 19/06056 |
| 2019/0294938 | A1* | 9/2019 | Huang | G06K 19/06037 |
| 2019/0385115 | A1* | 12/2019 | Biermann | G01K 1/024 |

FOREIGN PATENT DOCUMENTS

| | | | |
|---|---|---|---|
| JP | 05282481 A | * | 10/1993 |
| JP | 2001-91368 A | | 4/2001 |
| JP | 2001166836 A | * | 6/2001 |
| JP | 2001-194248 A | | 7/2001 |
| JP | 2002-37420 A | | 2/2002 |
| JP | 2005202103 A | * | 7/2005 |
| JP | 5563565 B2 | | 7/2014 |
| KR | 20070077536 A | * | 7/2007 |
| KR | 10-126608 B1 | | 5/2013 |
| WO | WO 2006/013754 A1 | | 2/2006 |
| WO | WO 2009/150641 A1 | | 12/2009 |

OTHER PUBLICATIONS

Korean-language Office Action issued in counterpart Korean Application No. 10-2017-7034685 dated Feb. 14, 2019 with English translation (nine pages).

International Search Report (PCT/ISA/210) issued in PCT Application No. PCT/JP2015/068446 dated Aug. 18, 2015 with English-language translation (Three (3) pages).

Japanese-language Written Opinion (PCT/ISA/237) issued in PCT Application No. PCT/JP2015/068446 dated Aug. 18, 2015 (Four (4) pages).

Chinese-language Office Action issued in counterpart Chinese Application No. 201580080688.1 dated Dec. 24, 2019 with English translation (19 pages).

\* cited by examiner

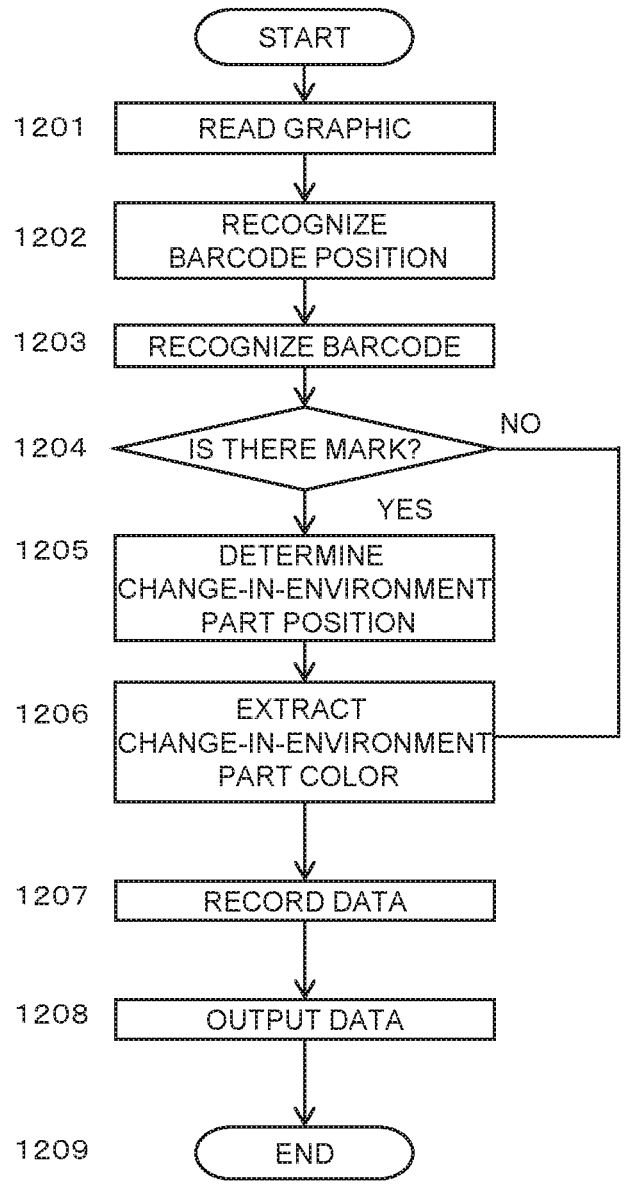

ITEM HAVING BARCODE, DATA PROCESSING DEVICE, DATA PROCESSING METHOD, AND MERCHANDISE QUALITY MANAGEMENT METHOD

TECHNICAL FIELD

The present invention relates to display articles for managing the environmental conditions for items at the time of transportation or storage, reading devices for reading displayed data, and reading methods for reading displayed data mainly at the time when the items are transported or stored.

BACKGROUND ART

For some items, it is necessary to appropriately manage the environmental conditions such as temperature, humidity, vibration, gas, and barometric pressure when the items are transported from their manufacturing premises to their consuming regions. For example, there are some food items that become unsuitable for consumption because they go rotten or lose taste when they are put under an environment condition such as a high temperature or a low temperature. In addition, there are some food items the qualities of which deteriorate when they are put under the environmental condition of high humidity, the environmental condition of the concentration of oxygen present in the air, or the like. Furthermore, there are some items that are damaged when unforeseen vibrations are applied to the some items.

In order to cope with the abovementioned problems, when items that are targets are transported or stored, measures are taken in which the items are housed in airtight containers, or temperature management and humidity management using air conditioning devices, vibration management, and the like are executed in transport containers, transport cargo trucks, or property rooms.

However, there are some cases where, owing to the failures of the devices or mistakes in the above management, the above management items depart from their respective management ranges. Therefore, in order to judge whether such departures have occurred or not, the following devices and methods are proposed.

Patent Literature 1 discloses a method in which a temperature-indicating member that changes its color in accordance with temperature is attached to an item that is a management target, and a code shown by a barcode adjacent to the item and the color of the temperature-indicating member are read by a reading device. In addition, a method, in which the temperature history is estimated by analyzing the read codes and the read color data, is disclosed. Furthermore, a method, using which a temperature-indicating member the color of which varies in accordance with temperature is produced, is also disclosed.

Patent Literature 2 discloses a method in which plural barcodes whose colored or non-colored bars change in accordance with a temperature range at the time of barcode reading are attached to items, and only a single barcode is read on the basis of a temperature at the time of barcode reading. Furthermore, a method, in which these read data are transmitted to a computer, and the quality management of the items is executed, is disclosed.

Patent Literature 3 discloses a method using which a detection agent sheet, the color of which changes in accordance with oxygen atmosphere, is produced. The above method is a method using which the detection agent sheet, the color of which is red when the sheet is kept airtight after being manufactured, but becomes blue when the sheet is freed from the airtight state, is produced.

CITATION LIST

Patent Literature

Patent Literature 1: Japanese Unexamined Patent Application Publication No. 2001-91368
Patent Literature 2: Japanese Patent No. 5563565
Patent Literature 3: WO 2006/013754

SUMMARY OF INVENTION

Technical Problem

When items are transported or stored, although there is a case where items of only one type are treated, there is often a case where items of many types are treated. In such a case, it is typical that different items need different management terms relating to the environments of these items. For example, there are items of many types such as an item that needs only the management of an upper limit temperature, an item that needs only the management of a lower limit temperature, an item that needs management of both upper limit and lower limit temperatures, and an item that needs both management of temperature and humidity. In addition, there may be a case where the abovementioned items are treated along with items that do not need any management.

In such a case, it is necessary to change the number of environmental condition display parts in accordance with the types of items. However, only one method in which the color of one display part, is read is disclosed in Patent Literature 1. Furthermore, both Patent Literature 1 and Patent Literature 2 disclose only a method in which the change of one type of change-in-environmental condition "temperature" is read. In addition, a method disclosed by Patent Literature 3, in which the color change relating to oxygen atmosphere is used instead of the color change relating to temperature, can read only the change of one type of change-in-environmental condition.

The present invention has been achieved with the abovementioned problems in mind, and one of the objects of the present invention is to provide means for obtaining required data even though there is one type of reading device or one type of reading method for items of plural types.

Solution to Problem

In order to solve the abovementioned problems, an item according to the present invention has a change-in-environment part and a barcode which contains data relating to the change-in-environment part. Furthermore, data processing device according to the present invention includes: means for reading a barcode and a change-in-environment part; means for extracting, from the barcode which has been read, data pertaining to the change-in-environment part; and means for recognizing change-in-environment data on the basis of the data pertaining to the change-in-environment part. Further, an item has a change-in-environment part and a barcode which contains data relating to the change-in-environment part.

Advantageous Effects of Invention

According to the present invention, even one type of reading device or one type of reading method can provide means for obtaining required data from many types of items.

BRIEF DESCRIPTION OF DRAWINGS

FIG. 5 is a diagram showing the procedure of a reading method.

DESCRIPTION OF EMBODIMENTS

Hereinafter, embodiments will be explained with reference to the accompanying drawings.

First Embodiment

Figure 1A:
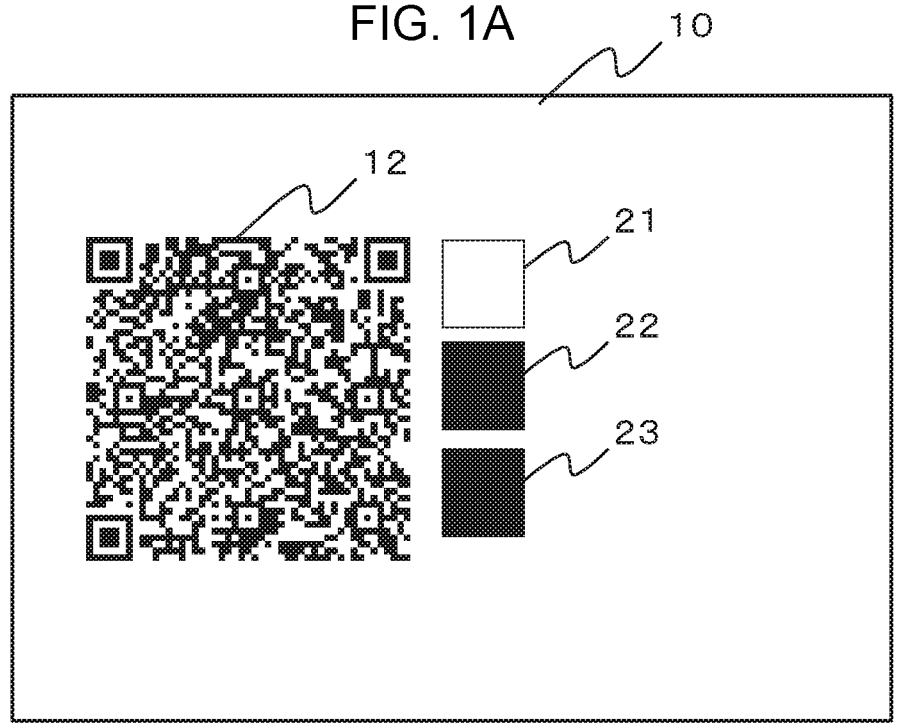
FIGS. 1A and 1B are diagrams showing the images of merchandise pieces in which barcodes and change-in-environment parts are shown.
Figure 1B:
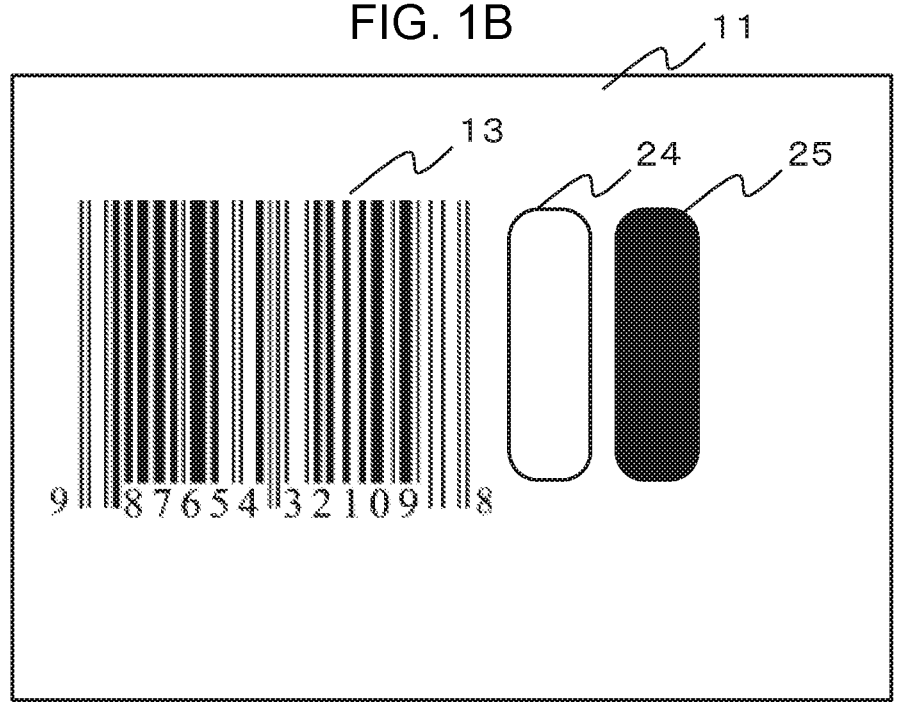

FIG. 1(a) and FIG. 1(b) show merchandise pieces (10, 11) in which bar codes and change-in-environment parts (21, 22, 23, 24, and 25) are shown using a typical two-dimensional barcode (12) and a typical one-dimensional barcode (13) respectively. In the barcodes, character strings including numerals, alphabets, and the like are represented by patterns. In this embodiment, the presence or absence, the number, the types, and the positions of change-in-environment parts are included in the character strings. Here, the barcodes (12, 13) only show their presences respectively in image fashions, therefore the patterns of the barcodes shown in FIG. 1 and FIG. 2 do not represent actual character strings according to this embodiment. The details of character strings that are targets of this embodiment will be explained in detail later. Although barcodes have various gauges other than different dimensions, the present invention is not dependent on these gauges. In addition, although, when a character string is patternized, various types of conversion processing are performed, the present invention is not dependent on these types of conversion processing methods.

A change-in-environment part is a part to which ink the color of which changes in accordance with environmental conditions such as temperature, humidity, vibration, gas, and barometric pressure is applied. Although there is no constraint to the position, the shape, the size, the number, etc. of at least one change-in-environment part in the present invention, it is preferable to dispose the at least one change-in-environment part so that the at least one change-in-environment part can be easily brought in as a graphic along with the relevant barcode when the relevant data is read. For example, it is preferable that the at least one change-in-environment part is disposed in the vicinity of the relevant barcode. The shape can be a square, a rectangle, a circle, an oval, a rectangle with its corners rounded, or the like. In other words, there is no special constraint to the shape. It is preferable that the size of a change-in-environment part is larger than a bar or a dot of the relevant barcode. Furthermore, it is conceivable that the size of a change-in-environment part is made large enough to be visually recognizable. When plural change-in-environment parts under changing conditions different from each other are disposed, plural environmental conditions can be grasped at the same time. For example, combinations of plural, temperatures and humidity that change at different temperatures can be thought of. Although plural change-in-environmental parts may have the same shapes and sizes, they have different shapes and sizes from each other. If a barcode is a one-dimensional barcode, data reading may be executed linearly, therefore it is preferable that the heights of change-in-environment parts (24, 25) are set equal to the lengths of the bars of the barcode (13), and the longitudinal directions of the change-in-environment parts (24, 25) are set equal to the directions of the bars. However, in the present invention, the abovementioned dispositions of the change-in-environment parts are not always required.

The barcodes and the change-in-environment parts can be directly printed on the merchandise pieces (10, 11), or it is conceivable that the barcodes and the change-in-environment parts are printed on stickers, and the stickers are put on the merchandise pieces. Alternatively, character strings represented by the codes can be printed in the vicinities of the merchandise pieces in the form of characters. As for a variable color, it is also preferable that a color shown by the variable color in the case where the relevant environmental condition falls within a predefined range, and a color shown by the variable color in the case where the relevant environmental condition departs from the predefined range are explained by postscripted characters or the like.

In this embodiment, data relating to the presence or absence, the number, the types, and the positions of change-in-environment parts is included in a character string represented by a barcode. Concrete methods for representing the data will be explained hereinafter.

The simplest method is a method in which the presence or absence, the number, the types, and the positions of change-in-environment parts of a merchandise piece as well as a code representing the merchandise piece is represented by a character string as they are. For example, a character string is "1234567;count=3;temperature 10,1.2,0.1;temperature 20,1.2,0.2;moisture,1.2,0.3". A code "1234567" is a code representing a merchandise piece, and this code is a code usually used for the merchandise piece as it is. A code "count=3" represents that the number of the types of change-in-environment parts is 3. If there is no change-in-environment part, the code can be set as "0", and all codes other than the merchandise code can be omitted in the character string. A code "temperature 10,1.2,0.1" shows that a change part which changes at temperature 10 degrees is located at the point of an abscissa 1.2 and an ordinate 0.1. Although the position of a change-in-environment part can be represented by actual lengths in millimeters, it is preferable that the position is represented by relative positions with reference to the reference positions of a barcode. In this example, a coordination system, in which the upper left reference point of the two-dimensional barcode (12) is set as the original point of this coordination system, the upper right reference point is set as an abscissa 1, and the lower left reference point is set as an ordinate 1, is defined, and the center position of each change-in-environment part is represented using this coordination system. With the use of this method, the position of a change-in environment part can be read even if the change-in-environment part is disposed at an arbitrary position.

If the above method is adopted, a character string displayed in a barcode section becomes long, so that an area necessary for displaying the barcode becomes large. This problem can be solved by coding display contents. For example, if it is predefined that "temperature 10" is represented by "T1", "temperature 20" is represented by "T2", "moisture" is represented by "M", and the values of coordinates are represented by values obtained by multiplying the actual values by ten, that is, the values are represented by two-digit integers, the above character string can be represented by a shorter character string "1234567;count=3; T11201;T21202;M1203". Furthermore, "count=3" can also be shortened by coding, or this can be omitted by using the number of parts representing the types and coordinates of the change-in-environment parts.

By further advancing such an idea, a method in which a merchandise code itself is used as a code representing change-in-environment parts is conceivable. For example, it is such a method in which the first character of a merchandise code represents the number of change-in-environment parts, the second and third characters represent the types of the change-in-environment parts. Since it is rather difficult to indicate of the positions of change-in-environment parts in a merchandise code, it is preferable that the positions of the change-in-environment parts are determined in advance. In other words, the positions are determined in such a way that the first change-in-environment part is disposed at a point of an abscissa 1.2 and an ordinate 0.1, the second at a point of an abscissa 1.2 and an ordinate 0.2, the third at a point of an abscissa 1.2 and an ordinate 0.3, and the like. If the positions of change-in-environment parts are determined in advance, it is unnecessary to include the position data in a character string. This method can be used in the first-mentioned method in which coding is not executed as well. When a barcode is a one-dimensional barcode, the length of a character string that can be shown is constrained, therefore this method is especially useful. Here, a method in which the number and types of change-in-environment parts are shown in a merchandise code is not limited to the above-described method in which specific characters are associated with the number and types of change-in-environment parts.

Figure 2:
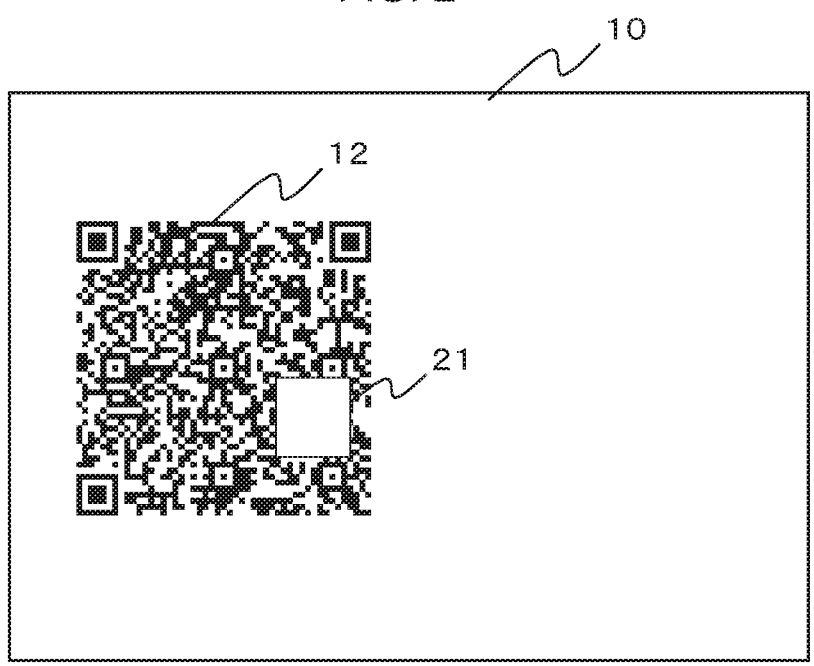
FIG. 2 is a diagram showing an image of a merchandise piece in which a barcode and a change-in-environment part are shown.

In the above-described method, some examples, in which the number and types of change-in-environment parts are disposed outside of a barcode so that the change-in-environment parts do not overlap the barcode, have been explained. In the case where a barcode, which is in a matrix type two-dimensional code format, is used, because the barcode is provided with a data error correction regulation, even if a part of the barcode is lost, character string data originally defined can be read. Therefore, a change-in-environment part can be disposed inside of a barcode as shown in FIG. 2. It becomes possible to dispose a change-in-environment part in such a way by setting both abscissa and ordinate of the change-in-environment part between 0 and 1.

Although the leading part of a character string has been configured to be occupied by a merchandise code in the abovementioned example, the leading part can be occupied by a URL which is used for accessing a specific site, for example, by a character string "http://www.***.com/code.aspx?ID=1234567;count=3;temperature 10,1.2,0.1;temperature 20,1.2,0.2;moisture,1.2,0.3". It is not necessarily required that a type of display method used in the present invention should be any of the above-described display methods.

A barcode and change-in-environment parts, which have been described above and printed on a merchandise piece, are read by a reading device on a basis of the operation executed by a person who deals with the merchandise piece during the manufacturing stage, distribution stage, or consuming stage, and the data is recorded or transmitted. The reading method and the reading/processing method will be explained in detail in a second embodiment. Summarily speaking, first the character string of a barcode is read, and data relating to a merchandise code, the presence or absence, the number, the types, and the positions of change-in-environment parts is extracted from the character string.

Next, the color data of the change-in-environment parts is read on the basis of the latter, and the merchandise code and the color data are recorded in a memory, and transmitted. Data transmitted from plural reading deices are aggregated and recorded. From the recorded data, data that goes beyond an initially expected change-in-environment range, or data corresponding to each of conditions such as a specific time period, a specific location, a specific merchandise code, and a specific reading device number can be retrieved. The retrieval results can be displayed in the form of a list, a graph, a map, or the like. In the list, detailed measurement data can be referred to, and an aggregated value that is obtained from the number of data satisfying each of the above conditions can also be referred to. The aggregated values can also be referred to in the form of a graph. The change-in-environment value, the time period, the location, the merchandise type, the number of data or the like can be represented by the ordinate axis and the abscissa axis of a graph. In addition, if, using data relating to the position of data which is read under a specific condition, points the number of which is equal to the number of the read data are plotted at the corresponding positions on a map, it becomes possible to refer to the regional stretch of the read data. When these retrieval results are referred to and analyzed, a range departing from the initially expected range of the environment of the merchandise piece can be grasped, which leads to the improvement of the merchandise quality management method.

Here, if a change-in-environment part has a characteristic that its color does not get back to its original color if once its color changes, the intermediate state of the change-in-environment part can be grasped. Furthermore, if the color change of a change-in-environment part includes medium colors, medium temperatures and medium, humidity can also be grasped. If a reading device holds data used for color judgment in advance, whether the quality management is good or bad can be judged when the color data of the relevant change-in-environment part is read without the color data being transmitted, and if the quality management is bad, processing such as displaying a warning or emitting a warning beep can be executed. In addition, if a judgment reference value is included in a character string represented by a barcode, whether the quality management is good or bad can be judged using the judgment reference value.

In the case where a barcode is a one-dimensional barcode, the length of a character string that can be expressed is constrained. Furthermore, reading processing is sometimes performed along the horizontal line shown in FIG. 1(b). Therefore, it is preferable that the change-in-environment parts (24, 25) are laterally arranged so that they orthogonally cross the line along which the reading processing is expected to be performed. In addition, it is preferable that the longitudinal sizes are approximately equal to the lengths of the bars of the barcode. Furthermore, when the coordinates of positions are specified, the abscissas of the coordinates have only to be specified.

For example, in the case where a change-in-environment part is made to thermally change, inorganic thermochromic material composed of metal complex salt such as $CoCl_2$ for example, or organic thermochromic material composed of fused aromatic ring substitutes such as spiropyran compounds has been conventionally used. There are two types of color changes, that is, one is a reversible color change, and the other is an irreversible color change. In the reversible color change, the color of a change-in-environment part changes many times in accordance with the up-and-down of temperature, and in the irreversible color change, the color of a change-in-environment part does not go back to its original color once its color changes at a certain temperature. An irreversible color can change its color as a result of the fact that ink, the viscosity of which is changed in accordance with temperature, penetrates into the penetrated material of the relevant irreversible color change substance when the irreversible color change substance is exposed to a temperature equal to a predefined temperature or higher for a certain time so that the ink penetrates into the penetrated material of the irreversible color change substance. The types and configurations of a substance and a penetrated material that can be used in the present invention are not limited to the abovementioned ones, and any substance and any penetrated material can be used as long as their colors change in accordance with temperature change.

Second Embodiment

Figure 3:
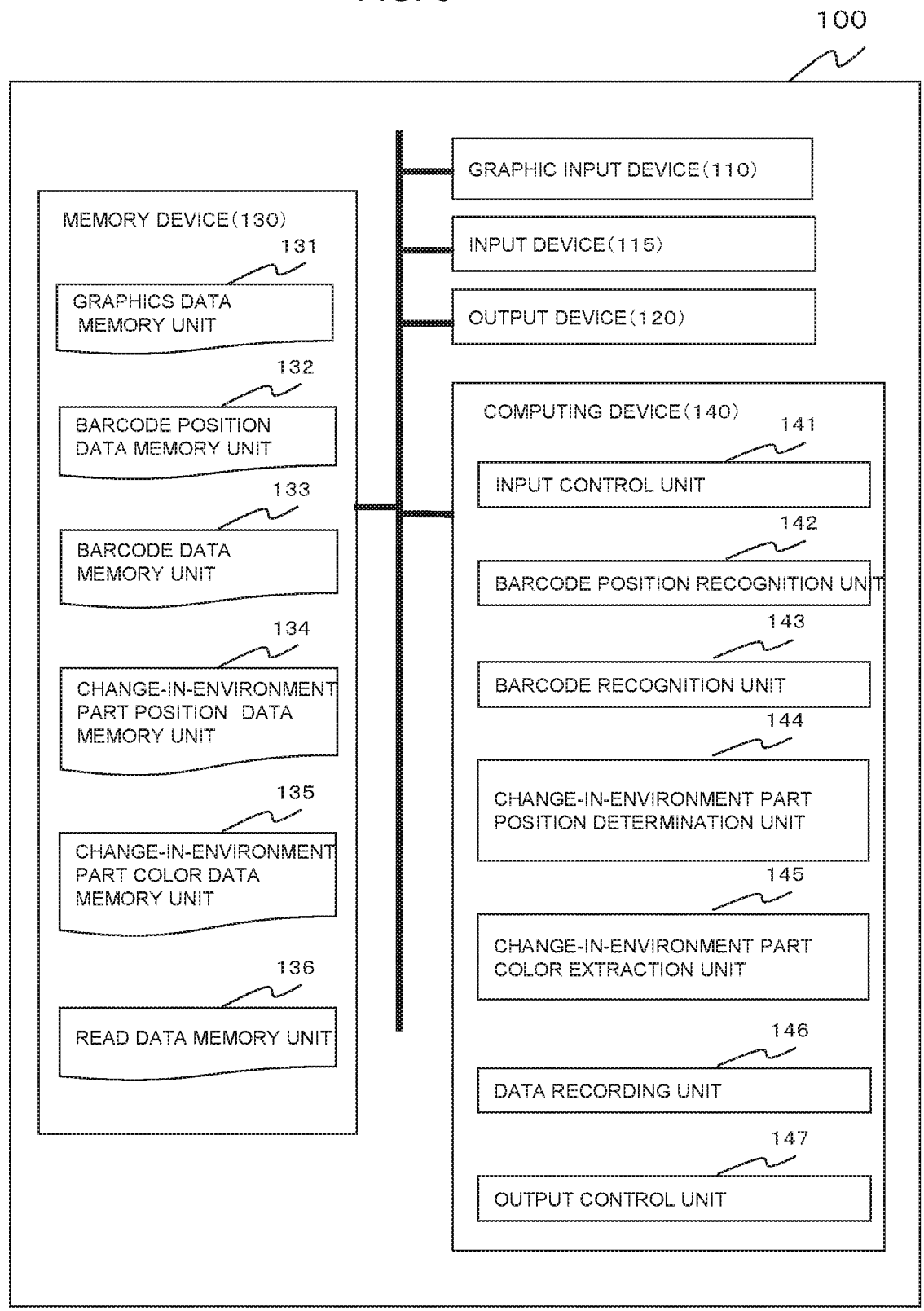
FIG. 3 is a diagram showing the configuration of a reading device.

FIG. 3 is a block diagram showing an example of a processing device (100) that reads the barcodes and change-in-environment parts explained in the first embodiment as data.

A graphic input device (110) is a so-called camera that executes graphic input, and when the graphics of a barcode part and change-in-environment parts are photographed by the graphic input device (110), the photographed graphics are recorded in a graphic data memory unit (131) of a memory device (130).

An input device (115) is a device that accepts the instructions from an operator, and includes buttons and a touch panel.

An output device (120) is a device that outputs instruction information to an operator, read graphics, read results, and the like, and includes a display and a communication device. This configuration shows a typical configuration of the processing device (100), and another configuration, in which any or all of the graphic input device, the input device, and the output device are connected to the outside of the data reading device (100), is also conceivable.

The memory device (130) is a device that stores various data, and includes the following memory units.

The graphic data memory unit (131) is a unit that stores the graphic images of the barcode and change-in-environment parts input by the graphic input device (110).

A barcode position data memory unit (132) is a unit that stores data representing reference positions of barcodes recognized from graphic images recorded in the graphic data memory unit (131) by an after-mentioned barcode position recognition unit (142).

A barcode data memory unit (133) is a unit that stores character string data represented by barcodes recognized from graphic images recorded in the graphic data memory unit (131) by an after-mentioned barcode recognition unit (143).

A change-in-environment part position data memory unit (134) is a unit that memorizes data representing the positions of change-in-environment parts determined by an after-mentioned change-in-environment part position determination unit (144). This data is data that represents "0" when there is no change-in-environment part, "1" when there is one change-in-environment part, and plural when there are plural change-in-environment parts.

A change-in-environment part color data memory unit (135) is a unit that stores color data extracted by an after-mentioned change-in-environment part color extraction unit (145). As many color data pieces as data pieces stored in the change-in-environment part position data memory unit (134) are stored in the change-in-environment part color data memory unit (135).

A read data memory unit (136) is a unit that stores data created and recorded by an after-mentioned data recording unit (146). This data is data synthesized with the use of data stored in the barcode data memory unit (133) and data stored in the change-in-environment part color data memory unit (135).

A computing device (140) performs processing on data input from the graphic input device (110) and input device (115) and data stored in the memory device (130), and outputs the obtained result to the output device (120) or records the obtained result in the memory device (130). The computing device (140) includes the following processing units.

An input control unit (141) is a unit that classifies data input from the graphic input device (110) and from the input device (115) into instructions and data, and transmits the instructions and data to the respective units of the memory device and the computing device. Graphic data including barcodes and change-in-environment parts is transmitted to the graphic data memory unit (131) as especially principal data.

The barcode position recognition unit (142) is a unit that recognizes a position including a barcode from graphic image data recorded in the graphic data memory unit (131), and records the recognition result in the barcode position data memory unit (132). Graphic data is usually composed of several hundred to several thousand dots, and there is no data that indicates which part of the graphic is a barcode in the graphic itself. Therefore, it is necessary to recognize to which parts of the graphic data the reference positions of the barcode correspond by analyzing the color data of each dot. Although the representation format of the reference positions and the number of the reference positions vary according to various barcode gauges, the present invention is not dependent on these barcode gauges. It is preferable that the recognition result is represented by the positions of the dots of the graphic data, that is, by coordinate values each of which is represented by a value in a left-to-right direction and a value in a top-to-bottom direction.

The barcode recognition unit (143) is a unit that, using the position data recorded in the barcode position memory unit (132), recognizes a character string represented by a barcode from the graphic image data recorded in the graphic data memory unit (131), and records the character string in the barcode data memory unit (133).

Figure 4:
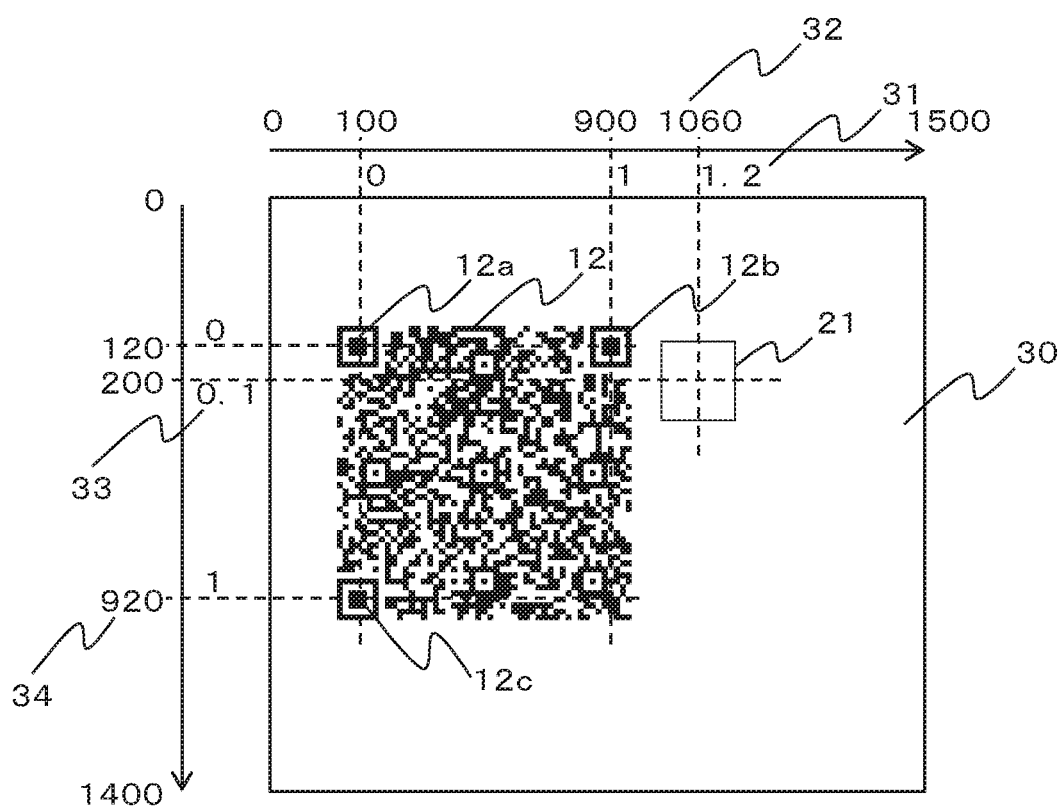
FIG. 4 is a diagram showing the image of graphic data.

The change-in-environment part position determination unit (144) is a unit that, using the position data recorded in the barcode position data memory unit (132) and the character string data recorded in the barcode data memory unit (133), determines the positions of change-in-environment parts, and records the determined positions of change-in-environment parts in the change-in environment part position data memory unit (134). The character string data recorded in the barcode data memory unit (133) includes information about a merchandise code, the number, the types, and the positions of change-in-environment parts, and the like, and read positions are determined using this information. The most preferable method is a method in which the positions of change-in-environment parts are calculated using a coordination system the reference points of which are set equal to the reference positions of a barcode. FIG. 4 is a diagram showing the image of graphic data. A barcode (12) and a change-in-environment part (21) are recorded in a memory (30) in which dots are disposed in a 1400-by-1500 matrix. The three reference positions (12a, 12b, 12c) of the barcode are located at dot positions (a lateral position 100, a longitudinal position 120), (a lateral position 900, a longitudinal position 120), and (a lateral position 100, a longitudinal position 920) of the graphic data respectively. In this case, if the coordinates of one change-in-environment part (21) are represented by an abscissa 1.2 and an ordinate 0.1 in a character string of the barcode, the lateral position of the change-in-environment part and the longitudinal position of the change-in-environment part can be calculated by (900−100)×1.2+100=1060 and (920−120)×0.1+120=200 respectively. Although it has been explained so far that the directions of the coordinates of the reference positions of a barcode and the directions of the coordinates of graphic data coincide with each other for the sake of simplicity, if the directions of both coordinates are different from each other, the barcode or the graphic data can be converted by executing rotation or the like. Although the above explanation has been made so far taking only the center position of a change-in-environment part as an example, similar processing can be performed on the number and range to be read, or the like.

Returning to FIG. 3, the change-in-environment part color extraction unit (145) is a unit that extracts color data of the change-in-environment parts from graphic image data recorded in the graphic image memory unit (131) on the basis of position data recorded in the change-in-environment part position data memory unit (134), and records the color data in the change-in-environment part color data memory unit (135). As described above, if position data is represented by the positions of dots of graphic data, the above processing can be performed only by reading the data of the dot of the relevant position. In other words, it is the processing of reading the color data of a dot at the lateral position 1060 and the longitudinal position 200. It is also preferable that, in order to eliminate noise data, the size of a change-in-environment part is set larger than the interval between dots, data at several adjacent points are read, and the average processing of the read data or the like is performed. Here, although color data can be processed by converting the color data into binary values, that is, a value corresponding black and a value corresponding white, the color data may be a multigradation sequence having neutral colors or color.

The data recording unit (146) is a unit that combines character string data recorded in the barcode data memory unit (133) with color data recorded in the change-in-environment part color data recording unit (135), and records the above combination in the read data memory unit (136). Generally speaking, it is preferable that, when the change-in-environment status of a merchandise piece is grasped, information about what happened to the merchandise piece and when and where it happened is gathered. Therefore, it is preferable that a date when and a place where the reading processing is performed, the number of the reading device, and the like are recorded in addition to the above character string data and color data. Here, since the place where the reading processing is performed and the reading device are not sequentially changed, it is conceivable that information about these is given at the time of after-mentioned data output processing. In addition, it is not necessary to record parts that are not necessary for grasping a change-in-environment status such as a part that represents the position of a change-in-environment part and the like. Although information about a place to be recorded can be an address or a postal code registered in advance, it is more preferable that a latitude/longitude data measured by a reading device having a GDP sensor is recorded as the information.

An output control unit (147) is a unit that outputs data recorded in the read data memory unit (136) to the output device (120). If the above output destination is a screen or the like, it is preferable that, every time a reading operation is executed, the result of the reading operation is output. Furthermore, in this case, it is preferable that whether a change-in-environment condition is good or bad is judged from the color of the relevant change-in-environment part using a judgment reference data prepared in advance, and the judgment result is output. If the output destination is a communication destination, output processing can be performed every time a reading operation is executed, or output processing can be performed after data obtained through several reading operations are put together or after data obtained during a predefined time period are put together.

FIG. 5 is a diagram showing a flow executed by the processing device (100).

First, graphic data including a barcode and a change-in-environment part is input from the graphic input device (110) according to an instruction from the input control unit (141), and the data is recorded in the graphic data memory unit (131) (1201).

Next, the graphic image data recorded in the graphic data memory unit (131) is transferred to the barcode position recognition unit (142), the reference positions of the barcode are recognized, and the recognized reference positions are recorded in the barcode position data memory unit (132) (1202).

In addition, the graphic image data recorded in the graphic data memory unit (131) and the position data recorded in the barcode position data memory unit (132) are transferred to the barcode recognition unit (143), a character string data represented by the barcode is recognized on the basis of the position data, and the recognized result is recorded in the barcode data memory unit (133) (1203).

Next, whether there is a change-in-environment part or not is judged from the character string data recorded in the barcode data memory unit (133), and only when there is a change-in-environment part, the processing shown in 1205 and 1206 is performed (1204).

First, if there is a change-in-environment part, the position data recorded in the barcode position data memory unit (132) and the character string data recorded in the barcode data memory unit (133) are transferred to the change-in-environment part position determination unit (144), the position of the change-in-environment part is determined, and the determined position of the change-in-environment part is recorded in the change-in-environment part position data memory unit (134) (1205). The position of the change-in-environment part is determined as described above.

Next, the position data recorded in the change-in-environment part position data memory unit (134) and the graphic image data recorded in the graphic data memory unit (131) are transferred to the change-in-environment part color extraction unit (145), the data of a position represented by the position data in the graphic image is extracted, and the extracted data is recorded in the change-in-environment part color data memory unit (135) (1206).

The next processing is processing performed regardless of whether there is a change-in-environment part, or not. The character string data recorded in the barcode data memory unit (133) and the color data recorded in the change-in-environment part color data memory unit (135) are transferred to the data recording unit (146), synthesis is executed using a combination of these data pieces, and this synthesis result is recorded in the read data memory unit (136) (1207). In the case where there is no change-in-environment part in this synthesis processing, a process, in which data pieces each of which represents "null" are combined, the data part of the change-in-environment part color is set nil, or other means are used, is executed on the basis of a predefined format.

Lastly, the data recorded in the read data memory unit (136) is transferred to the output control unit (147), and the transferred data is output to the output device (120) (1208).

It is preferable that the device according to this embodiment is materialized by executing programs that realizes the above-described methods using a general-purpose smartphone that is equipped with a camera, a screen, and a communication device, or the like. However, the present invention can also be materialized without being limited to this embodiment.

Each embodiment that has been described so far provides means in which, using one type of reading device or one type of reading method, color changes of necessary and sufficient places of various types of items that have no change-in-environment part, a single change-in-environment part, or plural change-in-environment parts are read and sufficient data is obtained. Furthermore, each embodiment provides means in which plural management items for one merchandise piece can be managed simultaneously. With this, means in which quality management of various types of management items for various types of merchandise pieces can be executed is provided.

To put it concretely, each embodiment includes the graphic input device (110) that is means for reading barcodes (12, 13) and change-in-environment parts (21 to 25), the change-in-environment part position determination unit (144) that is means for extracting data relating to the change-in-environment parts from the read barcodes (12, 13), and the change-in-environment part color extraction unit (145) that is means for recognizing change-in-environment data on the basis of the data relating to the change-in-environment parts. On the other hand, items include the change-in-environment parts (21 to 25) and the barcodes (12, 13) including data relating to those change-in-environment parts.

Although data that uses position information is introduced as data relating to change-in-environment parts in the above-described embodiments, barcodes (12, 13) that can be used in the present invention are not limited to barcodes including this type of data as long as the barcodes include information about any of the presence or absence, the number, the types, and the positions of change-in-environment parts.

Since each of the embodiments according to the present invention has the above-described configuration, the following advantageous effects can be obtained.

(1) The change-in-environment statuses of items whose presence or absence, number, types, and positions of change-in-environment parts are different from each other can be read using one type of reading device or one type of reading method.

(2) Owing to the merchandise quality management method pieces in which read data is recorded and a database is compiled in a way that can be retrieved, the change-in-environment statuses of items at their transportation time or at their storage time can be grasped.

(3) Places where inappropriate management is executed can be found and the improvement of the relevant management methods can be easily made by using the above result.

LIST OF REFERENCE SIGNS 10, 11: Commodity
12, 13: Barcode
21, 22, 23, 24, 25: Change-in-environment Part
100: Processing Device
110: Graphic Input Device
115: Input Device
120: Output Device
130: Memory Device
131: Graphic Data Memory Unit
132: Barcode Position Data Memory Unit
133: Barcode Data Memory Unit
134: Change-in-environment Part Position Data Memory Unit
135: Change-in-environment Part Color Data Memory Unit
136: Read Data Memory Unit
140: Computing Device
141: Input Control Device
142: Barcode Position Recognition Unit
143: Barcode Unit
144: Change-in-environment Part Position Determination Unit
145: Change-in-environment Part Color Extraction Unit
146: Data Recording Unit
147: Output Control Unit

The invention claimed is:

1. An item having one or more change-in-environment parts and a barcode, including character strings represented by patterns, which contains data relating to the one or more change-in-environment parts,
wherein the barcode includes information about a location of the one or more change-in-environment parts relative to a location of the barcode, and an indication of how many of the one or more change-in-environment parts exist in the item.

2. The item according to claim 1, wherein the barcode further includes information about any one of the presence or absence and a type of the one or more change-in-environment parts.

3. The item according to claim 1, wherein each of the one or more change-in-environment parts is a part to which ink the color of which changes in accordance with environmental conditions.

4. The item according to claim 3, wherein each of the one or more change-in-environment parts is a part to which ink the color of which changes in accordance with temperature.

5. A data processing device comprising:
means for reading the barcode and the one or more change-in-environment parts of the item according to claim 1;
means for extracting, from the barcode which has been read, data pertaining to the one or more change-in-environment parts; and
means for recognizing color data of the one or more change-in-environment parts on the basis of the data pertaining to the one or more change-in-environment parts.

6. The date processing device according to claim 5, wherein the means for extracting, from the barcode which has been read, data pertaining in to position of the one or more change-in-environment parts.

7. A data processing method comprising:
reading the barcode and one or more change-in-environment parts of the item according to claim 1;
extracting, from the barcode which has been read, data pertaining to the one or more change-in-environment parts; and
recognizing change-in-environment data on the basis of the data pertaining to the one or more change-in-environment parts.

8. The data processing method according to claim 7, wherein the barcode further includes information about any one of the presence or absence and the type of the one or more change-in-environment parts.

9. A merchandise quality management method, wherein the data obtained by the data processing method according to claim 7, is recorded and a database is compiled in a way that can be retrieved.

10. The item according to claim 5, wherein the data processing device has a means for transmitting the color data of the one or more change-in-environment parts together with the data regarding a date when the reading occurs.

11. The item according to claim 5, wherein the data processing device has a means for transmitting the color data of the one or more change-in-environment parts together with the data identifying a reading device or a place where the reading is performed.

12. The item according to claim 1, wherein the barcode is a two-dimensional barcode and each of the one or more change-in-environment parts is disposed inside the two-dimensional barcode.

* * * * *